United States Patent
Choi et al.

(10) Patent No.: US 9,021,594 B2
(45) Date of Patent: Apr. 28, 2015

(54) INTELLIGENT RISK LEVEL GROUPING FOR RESOURCE ACCESS RECERTIFICATION

(71) Applicant: International Business Machines Corporation, Armonk, NY (US)

(72) Inventors: Christopher Y. Choi, Southport (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/921,629

(22) Filed: Jun. 19, 2013

(65) Prior Publication Data

US 2014/0380484 A1 Dec. 25, 2014

(51) Int. Cl.
- *G06F 11/00* (2006.01)
- *G06F 12/14* (2006.01)
- *G06F 21/57* (2013.01)

(52) U.S. Cl.
CPC .................................. *G06F 21/577* (2013.01)

(58) Field of Classification Search
None
See application file for complete search history.

(56) References Cited

U.S. PATENT DOCUMENTS

| | | | |
|---|---|---|---|
| 7,673,344 B1* | 3/2010 | Rowney et al. | 726/26 |
| 8,176,561 B1* | 5/2012 | Hurst et al. | 726/25 |
| 2006/0248084 A1* | 11/2006 | Sack et al. | 707/9 |
| 2007/0156495 A1* | 7/2007 | King | 705/8 |
| 2007/0180490 A1* | 8/2007 | Renzi et al. | 726/1 |
| 2008/0288330 A1* | 11/2008 | Hildebrand et al. | 705/10 |
| 2009/0228316 A1* | 9/2009 | Foley et al. | 705/7 |
| 2010/0275263 A1* | 10/2010 | Bennett et al. | 726/25 |
| 2011/0307957 A1* | 12/2011 | Barcelo et al. | 726/25 |
| 2012/0047575 A1* | 2/2012 | Baikalov et al. | 726/21 |
| 2013/0024238 A1* | 1/2013 | Nielson et al. | 705/7.28 |
| 2014/0289793 A1* | 9/2014 | Moloian et al. | 726/1 |

* cited by examiner

*Primary Examiner* — Fikremariam A Yalew
(74) *Attorney, Agent, or Firm* — Jason H. Sosa; Noah A. Sharkan (57) ABSTRACT

A computing device receives requests for approval of a plurality of access entitlements, which includes respective identity accounts, each associated with security intelligence information. The computing device determines risk factors for each respective identity account and associated security intelligence information, and determines a risk level for each of the plurality of access entitlements based at least in part on the risk factors. The computing device groups the plurality of access entitlements based on the risk level determined for each of the plurality of access entitlements. The computing device determines if the risk level of a group is low-risk based on the risk level of the plurality of access entitlements of the group, and in response to determining the risk level of the group is low risk, the computing device enables approval of the plurality of access entitlements of the group.

13 Claims, 4 Drawing Sheets

INTELLIGENT RISK LEVEL GROUPING FOR RESOURCE ACCESS RECERTIFICATION

BACKGROUND

The present invention relates generally to the field of digital resource access, and more particularly to risk-based computer recertification of online access.

Today's world has a heavy dependence upon system-based applications and data. Productivity and efficiency improvements increasingly rely on computer technology to enable a user access to applications, data, and communications to perform tasks. This dependence extends across business, educational and personal environments, and presents an on-going issue of reducing risks of malicious activity by controlling access.

Businesses experience concerns of trade secrets being exposed, loss of intellectual property, data tampering and negative public exposure. Educational institutions similarly share concern over loss of intellectual property, data tampering, and may include additional risk concerns over undesired exposure of contribution donors and financial gift receipts. Online application users can be exposed to identity theft, public exposure of personal detail and system compromise.

Concerns exist for attacks on information technology assets from the "outside", implying security breeches from hackers or malicious software that is intended to penetrate system defenses and perform harmful tasks to violated systems. Hardware and software advances continue to serve a market that addresses and protects against such invasions. However, concerns continue to grow regarding attacks from "within" or from "insiders", which are often willingly given access to systems and applications to enable individuals to perform certain tasks, without regard to what additional unintended access to resources may be included.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades.

In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

BRIEF SUMMARY

Embodiments of the present invention disclose a method, computer program product, and system for approving access to a resource. A computing device receives requests for approval of a plurality of access entitlements, the plurality of access entitlements include respective identity accounts, and each identity account is associated with security intelligence information. The computing device determines one or more risk factors for each of the respective identity accounts and the associated security intelligence information of the plurality of access entitlements. The computing device determines a risk level for each of the plurality of access entitlements based at least in part on one or more risk factors of the respective identity accounts and associated security intelligence information. The computing device groups the plurality of access entitlements based on the risk level determined for each of the plurality of access entitlements. The computing device determines if the risk level of a group is low-risk based on the risk level of the plurality of access entitlements of the group, and in response to determining the risk level of the group is low risk, the computing device enables approval of the plurality of access entitlements of the group.

DETAILED DESCRIPTION

Embodiments of the present invention recognize that risk assessments to certify or recertify user access to organizational resources that only consider identity management based information, are limited and may prevent adequate protections. Identity management data focuses on the job role or function of a user associated with a resource access request, and may include historic access information, including access entitlements, which define specific privileges and limits associated with the access, security violations, job role history, and performance ratings. Embodiments of the present invention include security intelligence data that enhances the access identity management data with additional information regarding how, when and how-much resource access is made, and compliance conditions associated with use of access entitlements. Additionally, embodiments of the present invention address efficiency and effectiveness of resource access certification by classifying or grouping access entitlements based on determined risk levels, such that risk mitigation efforts can be focused on high level risk accesses, and low risk accesses can be certified or recertified in bulk by a single action.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
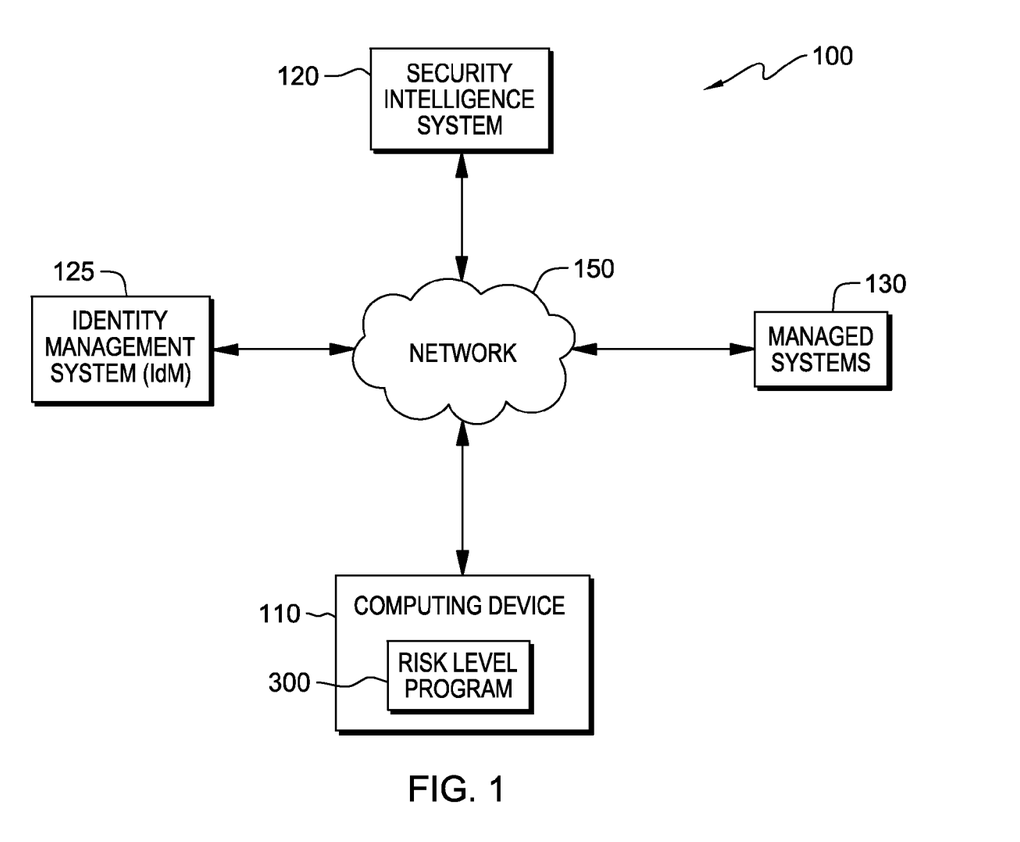
FIG. 1 is a functional block diagram illustrating a distributed data processing environment for resource access certification, in accordance with an embodiment of the present invention.

FIG. 1 is a block diagram illustrating a distributed data processing environment for risk certification of protected resources, in accordance to an embodiment of the present invention. The distributed data processing environment of FIG. 1, hereafter referred to as risk certification environment 100, includes computing device 110, security intelligence system 120, identity management system 125, managed systems 130, which are all interconnected via network 150.

Network 150 can be, for example, a local area network (LAN), a wide area network (WAN) such as the Internet, or a combination of the two, and can include wireline or wireless connections. In general, network 150 can be any combination of connections and protocols that will support communications via various channels between computing device 110, security intelligence system 120, identity management system 125, and managed systems 130, in accordance with an embodiment of the invention.

Computing device 110 may be a desktop computer, laptop computer, a specialized computer server, a client computer, tablet, or netbook personal computer (PC), a personal digital assistant (PDA), a smart phone, a mainframe computer, or a networked server computer. Further, computing device 110 can represent computing systems utilizing clustered computers and components to act as single pools of seamless resources when accessed through network 150, as is common in data centers and with cloud computing applications. In general, computing device 110 is representative of any programmable electronic device or combination of programmable electronic devices capable of executing machine-readable program instructions. Computing device 110 may include internal and external hardware components, as depicted and described in further detail with respect to FIG. 4.

Computing device 110 includes risk level program 300, which receives information associated with access certification and recertification for requesting users, from identity management (IdM) system 125, and from security intelligence system 120, via network 150. Risk level program 300 uses identity management data associated with access request identities, and further enhances the identity data with security intelligence data to determine an access risk level. The risk level associated with an access entitlement is used to categorize or otherwise group resource access entitlement requests based on the amount of risk associated with the type and use of the access entitlement and the identity associated with the access entitlement request. Grouping the access entitlements based on risk level enables appropriate focus on the higher risk levels and allows group disposition of low level risk access requests. Risk level program 300 will be discussed in greater detail with regard to FIG. 3.

Managed systems 130 represents various data related to the user of a resource access entitlement request. An access is the act of a user connecting to a resource enabled through the access entitlement associated with the identity of the user. An access entitlement includes permission to connect to the resource, and permissions with defined limits to perform actions on or with the resource. The limitations are defined within the access entitlement that is associated with the corresponding identity. An access entitlement request requires certification or recertification approval by an authority role, typically a supervisor or manager, and involves confirming the appropriate assignment of the access entitlement to an identity of a user.

The access entitlement request may be a new request for a user that is a new member of the resource owning organization. Alternatively, the request may be a new request of an access entitlement for a user that is an existing member of the organization, but has changed roles, added responsibilities, or may be confirming a recertification of a resource access entitlement that was previously approved. Managed systems 130 includes human resources data, which may comprise of one or more of: roles, positions, levels, or titles, performance rating, and employment duration. Information from managed systems 130 is accessible to identity management system 125, security intelligence system 120 and computing device 110 via network 150.

Figure 2:
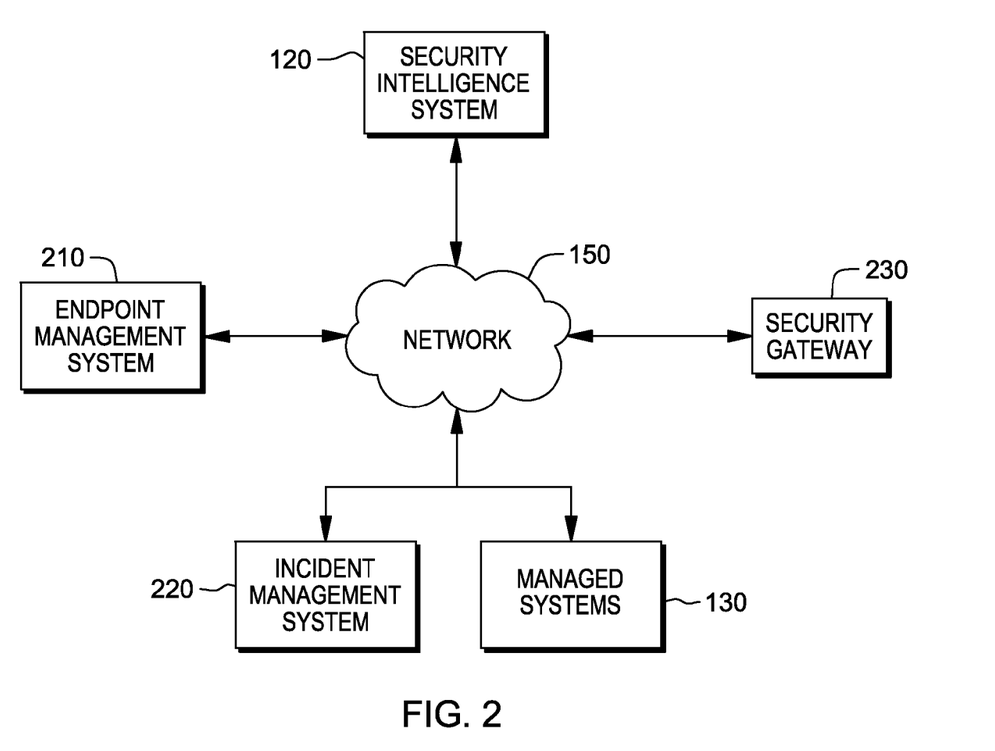
FIG. 2 is a block diagram depicting a security intelligence system aggregating security risk information, in accordance with an embodiment of the present invention.

Security intelligent system 120 receives security-relevant information from endpoint management system 210, incident management system 220, and security gateway 230, and may also receive information from managed systems 130, each to be discussed in more detail in regard to FIG. 2. Security intelligent system 120 is an aggregator for the disparate information available from other sources. Security intelligence system 120 provides details of how and when accesses are made, and may include information of where the access is made with respect to the organizational IT boundaries. Security intelligence system 120 may also include detailed information regarding security incidents associated with resources, accesses, and identities. The aggregate security intelligence data is provided to identity management system 125 to enhance the identity data used to determine risk level associated with access entitlements.

For example, identity management system 125 lists many user accounts among which is one account associated with user A that includes identity 1 and identity 2. Identity management system 125 includes the job role for user A, indicating that user A has been in the current job role for 3 years, and has been a member of the organization for 5 years. Identity management system 125 also indicates that user A's performance rating is acceptable. Security intelligence system 120 provides identity management system 125 with additional information indicating that user A, had recent security compliance violations and has consistently accessed a resource from identity 1 by use of a mobile device over the internet from a remote location, on weekends. The enhancement of the information provided by security intelligence system 120 increases the risk level of the access associated with identity 1 for user A, where it otherwise would not be determined that a higher security risk existed.

Identity management system 125 includes the information of accounts for a user, which is comprised of identities by which the user is recognized by each resource, and the history for each account. The history may include identity changes, and changes to an access entitlement. Identity management system 125 also includes security policies that define behavior and limitations associated with access entitlements to resources. Identity management system 125 may also include compliance requirements as part of a security policy, requiring certification or recertification by an authority/approving role for each identity of each user. Identity management system 125 uses the security data from security intelligence system 120 and user information received from managed systems 130 in determining access risk levels for protected resources.

FIG. 2 is a block diagram depicting a security intelligence system aggregating security risk information, in accordance with an embodiment of the present invention. FIG. 2 includes security intelligence system 120 that aggregates security risk information from endpoint management system 210, incident management system 220, managed systems 130, and security gateway 230, all interconnected via network 150. Security intelligence system 120 serves to aggregate security risk information from various sources, such as from endpoint management system 210, incident management system 220, managed systems 130, and security gateway 230. The security risk information from security intelligence 120 is received by identity management system 125 and is used to enhance the access entitlement related information associated with identity accounts. The enhanced access information enables a more complete and accurate determination of a risk level associated with an access entitlement. The determined risk level is used to differentiate resource access entitlements that have high risk levels, from those with moderate risk levels or low risk levels, or to differentiate any number of delineations that support the risk mitigation goals of the organization.

Endpoint management system 210 includes risk information for each access entitlement that includes where the access is made from, including characteristics of the environment from where the access was initiated. Endpoint management system 210 determines if access to a resource is made via a mobile device and whether the device is registered. Endpoint management system 210 also determines whether the device has been confirmed to be compliant with organizational security policies (e.g. the appropriate protective network security applications are installed on the device and properly configured), and whether the access entitlement uses a protective, compliant, and complex device password. The access entitlement risk information provided by endpoint management system 210 can be significant in determining an accurate access entitlement risk level.

For example, a comprehensive access entitlement risk level may determine a low risk level exists if the access entitlement and usage is characterized by: access made from a registered desktop computer that is compliant with the organization's IT security policies, access occurs during normal operating hours during the week, access duration time is brief, access entitlement permission for read-only activity, and identity management information indicates a stable job role, a positive performance rating history, several previous recertification approvals, and no security policy violations.

Additional risk information for access entitlements is provided to security intelligence system 120 by incident management system 220. Incident management system 220 associates an access entitlement with the application or system being accessed, and determines if the application or system has records of security incidents. The security incidents include but are not limited to attempts of system hacking, unauthorized access attempts (both inside and outside the organization's network), unauthorized access due to user negligence, and multiple password attempt fails. An access entitlement associated with an application, database, or system that has a record of security incidents has a higher risk level than access entitlements having no security incident associations. The type, frequency and impact of the security incidents may be used as a scaling factor in determining a risk level for the access entitlement.

Security gateway 230 includes risk information associated with who is making an access, when the access is made, for how long the resource is accessed, and also includes determining whether an access entitlement is used (connection made) within or outside the organization's network boundary. Accesses attempted or made by identities that are not authorized to access a resource, or who make accesses at unusual times, raise security risk concerns. Accesses that use the internet for connection to resources are considered higher risk than accesses that are only available from within the organization network. Security gateway 230 contributes to determining if the access is mostly used from outside the organization's network, when the access is made and by which identity, and in conjunction with endpoint management system 210, facilitates identifying the mobile device used for the access. For example, devices can be identified by a media access control (MAC) address, which is a unique identifier assigned to network interfaces for communications. Access data that shows a long duration of connection to a resource made by an unauthorized identity during non-business hours, consistently made from the same device, which is an unregistered, non-compliant mobile device, indicates a high risk. Alternatively, access data showing inconsistent access made from different devices, all registered, compliant and belonging to the same organization member, during business hours by an approved identity, may indicate a medium or low risk.

In one embodiment, security intelligence system 120 identifies security-related information that is absent or missing, as an indicator of higher risk. The level of risk may depend upon the type or amount of security-related information that is missing. Missing security-related information may indicate inappropriate tampering or other suspicious activity that may warrant a high risk assessment. For example, if it is detected that remote access is made by a mobile device which is not identified, or if information regarding the remote connection to a resource cannot be determined, the access entitlement, and possibly the resource, may be designated as high risk.

Figure 3:
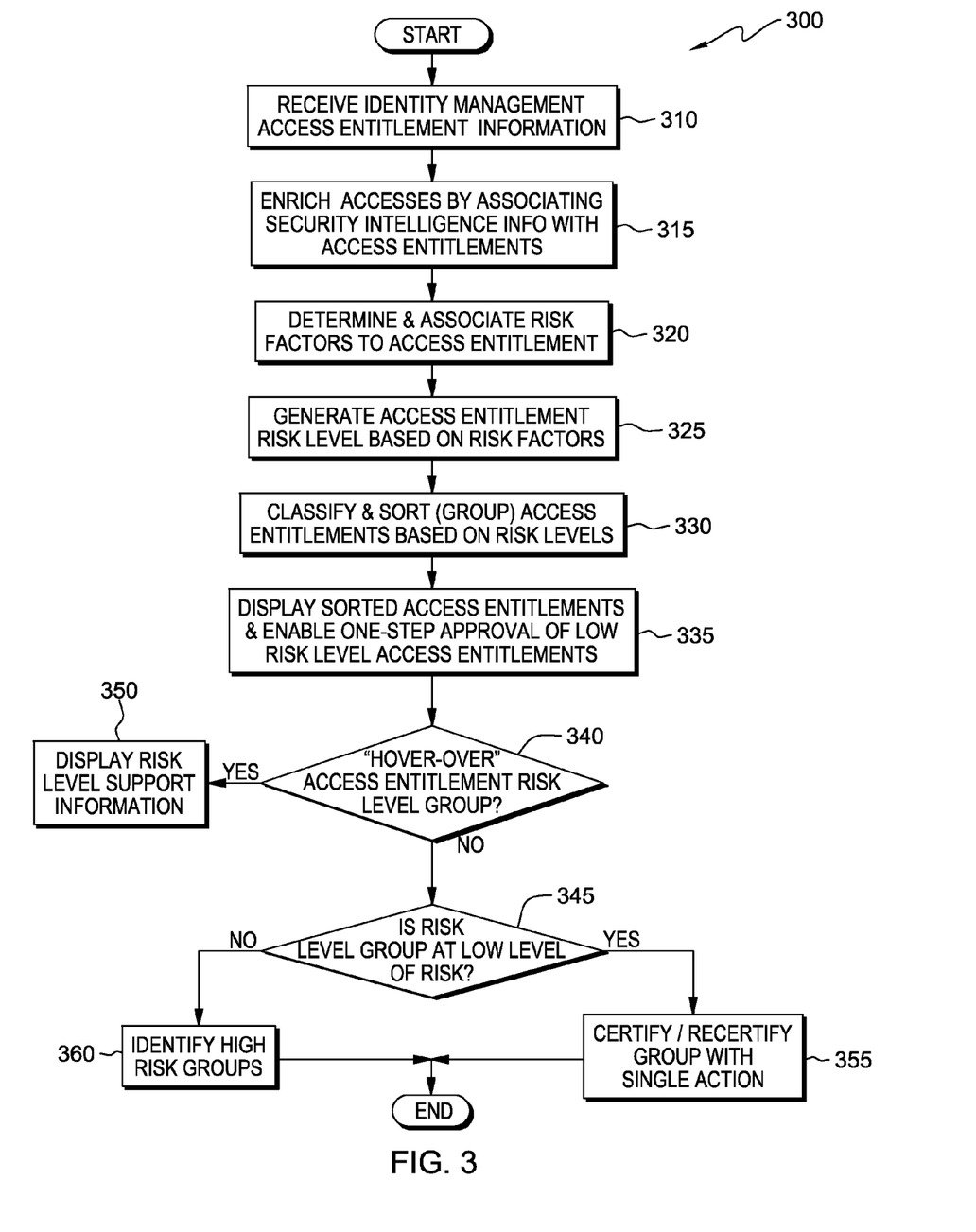
FIG. 3 is a flowchart illustrating operational steps of a risk level program operating on a computing device within the data processing environment of FIG. 1, in accordance with an embodiment of the present invention.

FIG. 3 is a flowchart illustrating operational steps of risk level program 300 operating on a computing device within the data processing environment of FIG. 1, in accordance with an embodiment of the present invention. In one embodiment, risk level program 300 resides on computing device 110 and receives access entitlement risk information from identity management system 125 that in turn receives additional access entitlement risk information from security intelligence system 120. Risk level program 300 receives the identity management and access entitlement information from identity management system 125 (step 310). Access entitlement information from identity management system 125 includes but is not limited to: user accounts, each with one or more identities associated with users and associated with access entitlements, roles, positions and titles associated with access entitlements, performance ratings, duration of time with the organization, security policies, previous certifications, compliance history, and approval requirements.

Risk level program 300 enriches the access information by associating the security intelligence information with access entitlements (step 315). The risk information from security intelligence 120, which can include security event information received directly from the systems and applications associated with the resource, is combined with the risk information of identity management 125 which results in a broader, more complete representation of security risk information. The elements of the combined security risk information are aligned with respective corresponding access entitlements or account identities.

For example, identity management system 125 includes data for an access entitlement identity that indicates a user that has the same role and has been part of the organization for five years has a good performance rating and has no security policy violations. The data from identity management system 125 would indicate a low risk with the requested access entitlement, however adding data from security intelligence system 120, such as accesses made on a non-compliant, unregistered mobile device, on weekends with lengthy access duration and multiple downloads, may indicate that the access entitlement is a much higher risk.

Risk level program 300 determines risk factors from the aligned security risk information elements and associates the risk factors to each access entitlement and/or identity account (step 320). Risk information elements are analyzed to determine the risk factors, which in one embodiment can be a comparison of risk information elements to values of a lookup table. In other embodiments, risk factors are conditional comparisons that can be pre-determined and included within a settings file for risk level program 300. Risk factors are conditions of attributes for an access entitlement that may be determined to indicate a level of risk associated with an access entitlement.

For example, one attribute of an access entitlement may be whether other identities having the same job role are approved for the same access entitlement. An indication that there are several identities that have the same job role and are approved for the same access entitlement may result in a low risk factor, whereas indications of no other identities having the same job role and approval for the access entitlement may be a high risk factor.

Risk level program 300 generates an access entitlement risk level based on the risk factors associated with each access entitlement (step 325). Having determined risk factors associated with access entitlements and those associated with identity accounts, risk level program 300 applies values to the risk factors. In one embodiment, risk factors are assigned values corresponding to whether the risk factor increases the risk (higher risk of security violation), or decreases the risk (lower risk of security violations), associated with an access entitlement. The values may be enumerated, such as values of 1, 2, 3, etc., in which higher enumeration values correspond to higher levels of security risk, for example. In other embodiments, risk factors may be assigned labels, such as "high", "medium", and "low" to indicate the corresponding level of risk. In yet other embodiments, risk factors may progress from highest risk level, designated by a letter, such as "A", to consecutively lower levels of risk, designated by the letters "B", "C", "D" . . . , for example. The assignment of values corresponding to the risk factors can be implemented in many ways, and the discussion presented herein is intended to explain by example and not limit possible implementations. Risk level program 300 combines the risk factor values associated with an access entitlement to derive a risk level for the access entitlement. In one embodiment, one or a combination of risk factors may be used as a scaling factor in determining risk levels for access entitlements.

For example, an access entitlement associated with identity 001 includes risk factors associated with a current job role, a previous job role, a lower performance rating, connection by mobile device, and numerous download activities. Identity 001 has a current job role that does not require the access entitlement, however, the access entitlement is associated with a previous job role of identity 001, and the risk factor associated with this is assigned the value 3 on a risk value range from 0 to 5; where 5 is the highest risk level. The lower performance rating risk factor is assigned a value of 3, and the connection by a mobile device is assigned a value of 3. The numerous occurrences of downloads, while using a mobile device is assigned a value of 4 (or may be a value of 5 if the access entitlement is to highly sensitive data). The overall value of the combined risk factors, using a simple addition model to combine values, is 13. If the threshold values associated with distinguishing the risk levels of "lowest", "low", "medium", "high", and "highest", were set at respective combined risk factor values of 4, 8, 12, and 16, the risk level of identity 001 (13), would be at a "high" risk level, (greater than 12 and less than 16), and would warrant mitigation actions.

In an alternative exemplary embodiment, identity 002 is associated with an access entitlement to an organization's financial records, with read-only permissions. Identity 002 has risk factors of: a single job role associated with the access entitlement, an excellent performance rating, has no security policy violations, connects to the resource by using a desktop computer from an office within the organization's network, has no transaction history of downloading or editing files or data of the resource, and has no history of attempts to exceed permissions of the access entitlement. Identity 002 is assigned a risk factor of 4 associated with the resource to which the access entitlement applies; however, all other risk factors would be at values of 0 or 1. Assuming an overall combination of risk factor values of 5, and threshold values pre-set to 4, 8, 12, 16, the access entitlement associated with identity 002 would be determined to be a risk level of "low".

Risk level program 300 sorts and classifies (groups) access entitlements based on the risk levels generated (step 330). Risk level program 300 uses the generated risk levels based on the risk factors associated with access entitlements, to sort access entitlements in an order of risk level. The sorting may be in a gradient order from either highest risk to lowest risk, or lowest to highest risk. Risk level program 300 classifies the access entitlements based on the risk level and pre-defined thresholds differentiating access entitlements into groups with similar risk levels. The number of different risk groups is defined by the choice of the number of thresholds, which can vary based on the particular security needs of the implementing organization. In one embodiment, access entitlements with risk levels are classified into three risk groups of high, medium and low. In other exemplary embodiments risk level program 300 applies four thresholds resulting in five groups that correspond to "highest risk", "high risk", "medium risk", "lower risk", and "lowest risk", risk groups.

Having sorted and classified access entitlements into risk groups, risk level program 300 displays the sorted access entitlements by risk groups, and enables a one-step approval of low-risk access entitlements (step 335). Embodiments of the present invention recognize that approvers of access entitlements for security certifications and re-certifications are presented with lists of access entitlements associated with identity accounts of users. Approvers may be presented with inadequate security-based information and may spend significant amounts of time determining if an access entitlement presents a high risk. Worse, approvers may incorrectly conclude that certification requests for resource access improves performance or efficiency of tasks performed by the user, and blindly approve access entitlements without proper consideration. Presenting access entitlements by risk groups enables an approver to immediately determine the level of risk associated with the access entitlement request. Given the grouping of access entitlement requests by the level of associated risk, the approver is enabled by risk level program 300 to approve a group with a risk level of low-risk, with a single action (one-step) and appropriately direct more time to higher risk access entitlement requests.

Risk level program 300 displays access entitlements that have been sorted into risk groups to a display device connected to computing device 100, for example. In one embodiment, each risk group includes listings of access entitlements associated with user identities that share similar risk levels. The complete listing of access entitlements may be presented as a single list for the risk group, or in other embodiments, the listing of access entitlements of the risk group may include subcategory groupings to facilitate navigation.

An approver of an access entitlement certification or recertification may have interest in the supporting reasons for including the access entitlement within a particular risk level group. The supporting details for classifying access entitlements into similar risk level groups can prove to be critical in approvers making better decisions. Risk level program 300 determines if an approver is "hovering over" a risk level group of access entitlements. In one embodiment, hovering refers to the positioning of the cursor of a pointing device connected to a computing device, over an enabled portion of the display screen for a period of time, such as 1-3 seconds. In other embodiments, utilizing touch-screens, hovering may involve touching and holding an enable position on the touch-screen, or similar action. For an enabled portion of the display screen, hovering will produce an additional display of information that can include text or images, for example. If risk level program 300 determines that an approver is "hovering-over" an access entitlement risk level group (step 340, "Yes" branch), the program responds by displaying risk level support information (step 350).

For example, in one embodiment of the present invention, risk level program 300 responds to a user hovering a pointing device over an enabled risk level group that is sorted and displayed by displaying additional information supporting the inclusion of access entitlements in the risk level group. The supporting reasons include the risk factors and value or labels associated with the risk factors for the access entitlements within the group. The display of the supporting security risk information for the risk level group facilitates an approver's decision making for certification/re-certification as well as determining mitigation actions that are considered.

If risk program 300 determines that a user is not hovering over an access entitlement risk level group (step 340, "No" branch), then risk access program 300 continues to present the access entitlements that have been classified by risk level and sorted from high risk to low risk, and determines if the access entitlement group is a low level of risk.

If the risk level group of access entitlements is classified as a low level of risk (step 345, "Yes" branch), then risk level program 300 provides to a reviewing approver, an option to certify/recertify the low-level risk group with a single action (step 355). For example, clicking an approval button associated with the low-level risk group on a display screen by using a pointing device connected to computing device 110, results in the approval of the low-level risk group for recertification. The risk level groups that can be enabled to certify or recertify can be defined in a settings file used by risk level program 300. In this manner access entitlements that do not require additional review or mitigation activity can be approved with high efficiency, without increasing overall risk to resources of the organization. Similarly, the thresholds for defining different risk levels can be adjusted in a settings file used by risk level program 300 to control approving the access entitlements for certification or re-certification with the highest efficiency and least impact to resource security.

If the risk level group of access entitlements is not classified as a low risk level (step 345, "No" branch), risk level program 300 identifies the high risk level groups for the approver to review and take appropriate actions (step 360). For example, risk level groups having security risk levels higher than (more risk) a user-defined threshold are not included in single action certification/re-certification options. Risk level program 300 determines the risk level groups that exceed the security risk threshold for a low level of risk and therefore are not included in single action certification/recertification. Risk level program 300 identifies the high risk level groups, which enables approvers to direct appropriate focus to access entitlements posing the highest security risks. The high risk level groups may be identified by any display or formatting technique that distinguishes the high risk level groups. The techniques may include, but are not limited to, displaying in a different color, labeling with text, and displaying in a different size. The risk level groups are enabled for approvers to select access entitlements and perform mitigating actions. Mitigating actions may include, but are not limited to, certifying the access entitlement, changing the attributes associated with the access entitlement then certifying, or denying the certification of the access entitlement. After an approver has completed certification/re-certification activity, the approver selects to end the program, and risk level program 300 ends.

In other embodiments of the present invention, identity management system data and security intelligence data may be limited for new members of the organization, or members that have other changes with minimal security-related history. Approvers may still lack adequate information on which to make access entitlement request decisions. Risk level program 300, in addition to identifying high risk groups, presents a listing of other users with current or previous approval for the same (or similar) access entitlement as the requestor. The other users that are presented have some relationship attribute commonality to the requestor being considered by the approver for access entitlement certification. The commonality may be one or a combination of: a member of the same team, having the same manager or supervisor, having the same role, position or title, working/attending at the same location, and having the same additional access entitlements to the approver.

For example, an approver is reviewing an access entitlement request for a first user, and access entitlement requestor who is new to the organization and has minimal security history information available. The approver is presented a list of other users that have requested or been approved for the same access entitlement. The list includes an indication of one or more common attributes of the other user with the first user being considered for access entitlement request certification. The list may indicate that a second user has the same access entitlement request and is on the same team as the first user. A third user may be presented as having been previously approved for the access entitlement and having the same manager as the first user, and a fourth user may have the same role as the first user and is also requesting the same access entitlement. The approver considers the information associated with the attributes in common with the users to make a certification approval decision.

Figure 4:
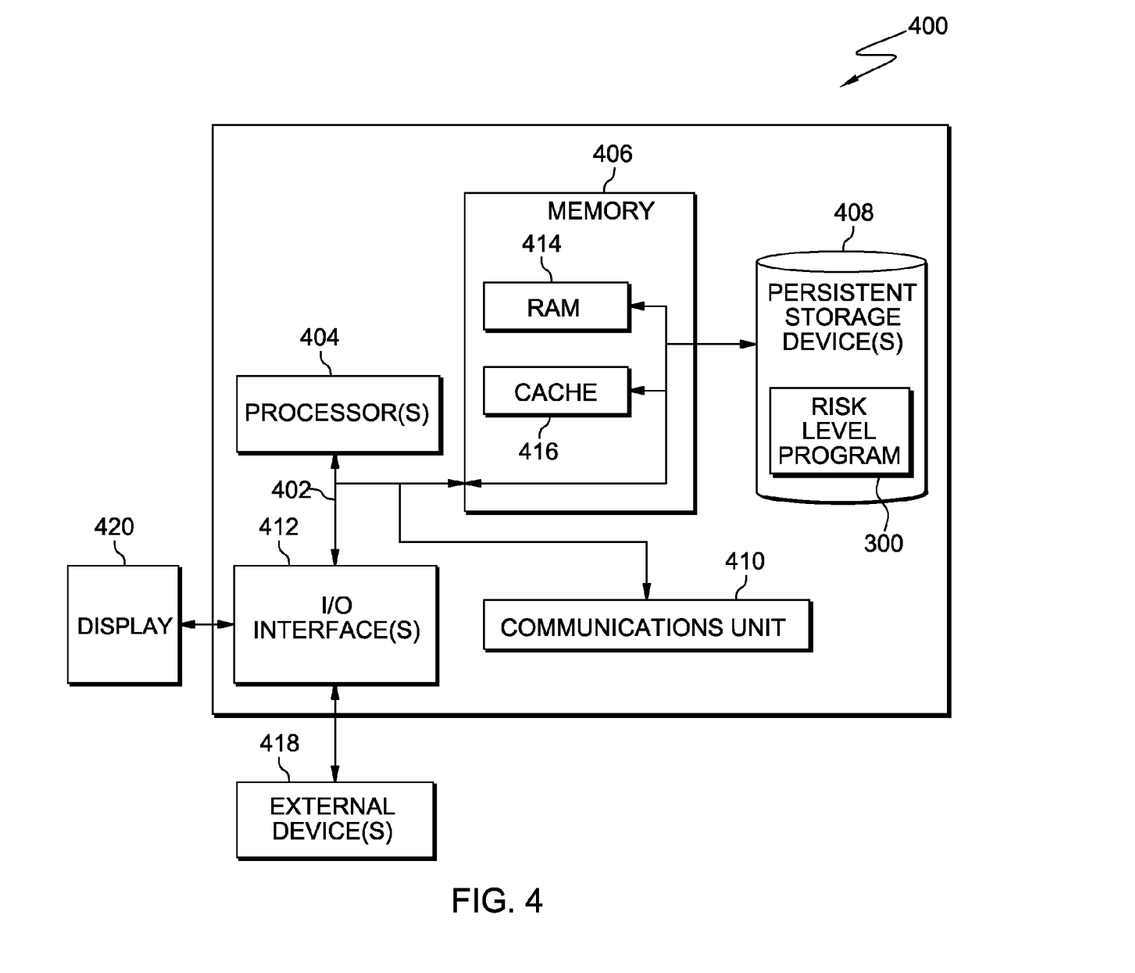
FIG. 4 depicts a block diagram of the components of the computing device, in accordance with an illustrative embodiment of the present invention.

FIG. 4 depicts a block diagram of components of data processing system 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing system 400 is representative of computing devices, such as computing device 110 on which risk level program 300 operations. Computing system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Risk level program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of risk certification environment 100, such as security identity management system 125, security intelligence system 120. In these examples, communications unit 410 includes one or more network interface cards. Communications unit 410 may provide communications through the use of either or both physical and wireless communication links. Risk level program 300 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., risk level program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for approving access to a resource, the method comprising:
   receiving requests for approval of a plurality of access entitlements, the plurality of access entitlements including respective identity accounts and each identity account associated with security intelligence information;
   determining one or more risk factors for each of the respective identity accounts and the associated security intelligence information of the plurality of access entitlements;
   determining a risk level for each of the plurality of access entitlements based at least in part on the one or more risk factors;
   grouping the plurality of access entitlements based on the risk level determined for each of the plurality of access entitlements;
   determining if the risk level of a group is low-risk based on the risk level of the plurality of access entitlements of the group;
   in response to determining the risk level of the group is low risk, enabling approval of the plurality of access entitlements of the group;
   setting a threshold that distinguishes one group from other groups, wherein risk levels of the plurality of access entitlements associated with the one group are similar, and the risk levels of access entitlements associated with the one group are different from risk levels of access entitlements associated with the other groups;
   sorting the group and the other groups based on the threshold that distinguishes the one group from the other groups;
   displaying the group and each of the other groups that are sorted in a gradient order of the risk level; and
   displaying supporting information including the risk factors associated with the risk level of the plurality of access entitlements of the group that a cursor of a connected pointing device hovers over.

2. The method of claim 1, wherein enabling approval of the plurality of access entitlements of the group that are determined to be low risk, based on the risk level of the plurality of access entitlements of the group, includes enabling approval of the group that is determined to be low risk by a single action of a user.

3. The method of claim 1, wherein the one or more risk factors of the respective identity accounts and the associated security intelligence information, includes missing information from at least one of: the respective identity accounts and missing information from the security intelligence.

4. The method of claim 1, wherein the one or more risk factors of the associated security intelligence information includes: a type of device making an access to a resource, whether the type of device is in compliance with protective attributes including a complex password, whether an access to a network of a resource owner is made remotely, a type of access made by a device, a time record of the access made by the device, a duration record of the access made by the device, an activity record of the access made by the device, and a frequency record of the access made by the device.

5. The method of claim 1, wherein displaying the group and each of the other groups that are sorted in a gradient order of the risk level, further comprises displaying, when a cursor of a pointing device is hovered over an access entitlement of the group, at least one identity of a user having a same access entitlement to a resource as a requestor listed in the group, and at least one relationship attribute of the at least one identity of the user having the same access entitlement to the resource as the requestor listed in the group, including at least one of: a same supervisor, a same title, a same role, a same location, a same team, and a same additional access entitlement.

6. A computer program product for approving access to a resource, the computer program product comprising:
   one or more computer-readable storage medium(s), wherein the one or more computer-readable storage medium(s) are not transitory signals, and program instructions stored on the one or more computer-readable storage medium(s), the program instructions comprising:
   program instructions to receive requests for approval of a plurality of access entitlements, the plurality of access entitlements including respective identity accounts and each identity account associated with security intelligence information;
   program instructions to determine one or more risk factors for each of the respective identity accounts and the associated security intelligence information of the plurality of access entitlements;
   program instructions to determine a risk level for each of the plurality of access entitlements based at least in part on one or more risk factors of the respective identity accounts and associated security intelligence information;
   program instructions to group the plurality of access entitlements based on the risk level determined for each of the plurality of access entitlements;

program instructions to determine if the risk level of a group is low-risk based on the risk level of the plurality of access entitlements of the group;

program instructions to, in response to determining the risk level of the group is low risk, enable approval of the plurality of access entitlements of the group;

program instructions to set a threshold that distinguishes one group from other groups, wherein risk levels of the plurality of access entitlements associated with the one group are similar, and the risk levels of access entitlements associated with the one group are different from risk levels of access entitlements associated with the other groups;

program instructions to sort the group and the other groups based on the threshold that distinguishes the one group from the other groups;

program instructions to display the group and each of the other groups that are sorted in a gradient order of the risk level; and program instructions to display supporting information including the risk factors associated with the risk level of the plurality of access entitlements of the group that a cursor of a connected pointing device hovers over.

7. The computer program product of claim 6, wherein the program instructions to enable approval of the plurality of access entitlements of the group that are determined to be low risk based on the risk level of the plurality of access entitlements of the group, include program instructions to enable approval of the group that are determined to be low risk by a single action of a user.

8. The computer program product of claim 6, wherein the one or more risk factors of the respective identity accounts and the associated security intelligence information, includes missing information from at least one of: the respective identity accounts and missing information from the security intelligence.

9. The computer program product of claim 6, wherein the one or more risk factors of the associated security intelligence information includes: a type of device making an access to a resource, whether the type of device is in compliance with protective attributes including a complex password, whether an access to a network of a resource owner is made remotely, a type of access, a time record of the access, a duration record of the access, an activity record of the access, and a frequency record of the access.

10. The computer program product of claim 6, wherein the program instructions to display the group and each of the other groups that are sorted in a gradient order of the risk level, further comprise program instructions to display, when a cursor of a pointing device is hovered over an access entitlement of the group, at least one identity of a user having a same access entitlement to a resource as a requestor listed in the group, and at least one relationship attribute of the at least one identity of the user having the same access entitlement to the resource as the requestor listed in the group, including at least one of: a same supervisor, a same title, a same role, a same location, a same team, and a same additional access entitlement.

11. A computer system for approving access to a resource, the computer system comprising:

one or more computer processors;

one or more computer-readable storage medium(s), wherein the one or more computer-readable storage medium(s) are not transitory signals;

program instructions stored on one of the one or more computer-readable storage medium(s) for execution by at least one of the one or more processors, the program instructions comprising:

program instructions to receive requests for approval of a plurality of access entitlements, the plurality of access entitlements including respective identity accounts and each identity account associated with security intelligence information;

program instructions to determine one or more risk factors for each of the respective identity accounts and the associated security intelligence information of the plurality of access entitlements;

program instructions to determine a risk level for each of the plurality of access entitlements based at least in part on one or more risk factors of the respective identity accounts and associated security intelligence information;

program instructions to group the plurality of access entitlements based on the risk level determined for each of the plurality of access entitlements;

program instructions to determine if the risk level of a group is low-risk based on the risk level of the plurality of access entitlements of the group;

in response to determining the risk level of the group is low risk, program instructions to enable approval of the plurality of access entitlements of the group;

program instructions to set a threshold that distinguishes one group from other groups, wherein risk levels of the plurality of access entitlements associated with the one group are similar, and the risk levels of access entitlements associated with the one group are different from risk levels of access entitlements associated with the other groups;

program instructions to sort the group and the other groups based on the threshold that distinguishes the one group from the other groups;

program instructions to display the group and each of the other groups that are sorted in a gradient order of the risk level; and program instructions to display supporting information including the risk factors associated with the risk level of the plurality of access entitlements of the group that a cursor of a connected pointing device hovers over.

12. The computer system of claim 11, wherein program instruction to enable approval of the plurality of access entitlements of the group that are determined to be low risk based on the risk level of the plurality of access entitlements of the group, includes program instructions to enable approval of the group that is determined to be low risk by a single action of a user.

13. The computer system of claim 11, wherein the one or more risk factors of the respective identity accounts and the associated security intelligence information, includes missing information from at least one of: the respective identity accounts and missing information from the security intelligence.

* * * * *